United States Patent [19]

Mangels

[11] 3,930,290

[45] Jan. 6, 1976

[54] SNAP-SHACKLE

[76] Inventor: Theodore F. Mangels, 163 Flower St., Costa Mesa, Calif. 92627

[22] Filed: Nov. 22, 1974

[21] Appl. No.: 526,325

[52] U.S. Cl. ............ 24/241 SB; 114/108; 294/83 R
[51] Int. Cl.² .................. F16G 15/08; B64D 17/38; A44B 13/00
[58] Field of Search .......... 294/83 R; 114/108, 113, 114/114; 24/241 R, 241 P, 241 PP, 241 SB, 241 SP

[56] References Cited
UNITED STATES PATENTS

| | | | |
|---|---|---|---|
| 462,721 | 11/1891 | Monroe | 294/83 R |
| 674,462 | 5/1901 | Germany | 294/83 R |
| 1,303,033 | 5/1919 | Coulter | 294/83 R |
| 1,576,352 | 3/1926 | Nordling | 24/241 SB |
| 1,621,604 | 3/1927 | Ruggles | 294/83 R |
| 1,711,440 | 4/1929 | Baker | 24/241 SB |
| 3,493,260 | 2/1970 | Smith | 294/83 R |
| 3,850,468 | 11/1974 | Hultin | 294/83 R |

*Primary Examiner*—Donald A. Griffin
*Attorney, Agent, or Firm*—Raymond L. Madsen

[57] ABSTRACT

There is disclosed a snap-shackle with a body having an interior cavity and first and second openings into the cavity, a hinge member being rotatably attached to the body to rotatably mate with and engage the second opening into the cavity. A latch member is pivotally attached to the body within the cavity and within the second opening, a portion of the latch member being exposed in the first opening through which opening the latch member is pivoted between a first pivotal position for engaging and locking the hinge member in the second opening to form a third opening between the hinge member and the body for receiving and coupling objects to the body and a second pivotal position for unlocking and releasing the hinge member to rotate and release the objects coupled thereby.

5 Claims, 4 Drawing Figures

SNAP-SHACKLE

The present invention relates to coupling or interconnecting devices and more particularly to quick-release coupling shackles or snap-shackles for the rigging of sailing craft.

In the field of quick-releasing shackles, it has been the general practice to employ cross-pin shackles to interconnect lines and sails and other rigging of sailing craft for quick release. Although such devices have served the purpose, they have not proved entirely satisfactory under all conditions of service for the reason that considerable difficulty has been experienced in releasing the shackle when under heavy load thereby endangering crew members who are required to use both hands to effect such release and difficulties have been encountered in accidental opening of the shackle through vibration.

Those concerned with the development of quick-release snap-shackles have long recognized the need for a snap-shackle that cannot shake or vibrate open and which can be released manually by one hand easily and quickly under load. The present invention fulfills this need.

One of the most critical problems confronting designers of quick-release shackles has been the design of a release mechanism which provides protection from accidental opening. This problem is overcome by the present invention.

The general purpose of this invention is to provide a snap-shackle which embraces all the advantages of similarly employed quick-release shackles and possesses none of the aforedescribed disadvantages. To attain this, the present invention contemplates a unique double-locking latch and trigger release mechanism contained and protected within the body of the snap-shackle whereby large release forces and accidental opening are avoided.

An object of the present invention is the provision of a snap-shackle which is easily and quickly released under heavy load with minimal release forces.

Another object is to provide a snap-shackle that cannot vibrate or shake open.

A further object of the invention is the provision of a snap-shackle having protection from accidental opening.

Still another object is to provide a snap-shackle that can be operated manually with one hand under all conditions of loading.

Yet another provision of the present invention is the provision of a snap-shackle which permits sail takedowns without easing or lowering the sail loading.

Other objects and many of the attendant advantages of this invention will be readily appreciated as the same becomes better understood by reference to the following detailed descriptions when considered in connection with the accompanying drawings in which like reference numerals designate like parts throughout the figures thereof and wherein.

Figure 1:
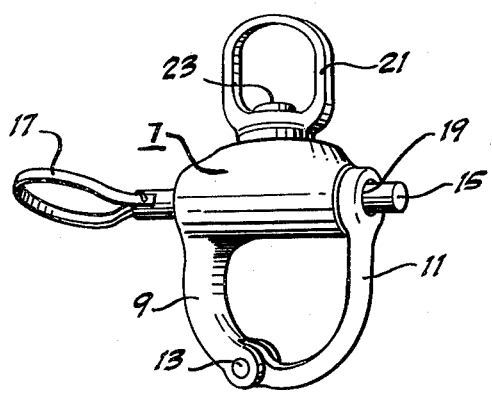
FIG. 1 illustrates a perspective view of a prior art cross-pin shackle.

Referring not to the drawings, wherein like reference characters designate like or corresponding parts throughout the several views, there is shown in FIG. 1 (which illustrates a prior art device) a body 7 having a projection 9 rotatably attached to a rotating arm 11 by a connecting pin 13. A cross-pin 15 extends through body 7 and is spring biased therein, one end of cross-pin 15 being rotatably connected to a pull ring 17 and the other end extending through body 7 to engage an aperture 19 in the end of hinge member 11. A swivel eye 21 is rotatably attached to body 7 by a swivel pin 23 oppositely disposed from projection 9.

Figures 2, 3:
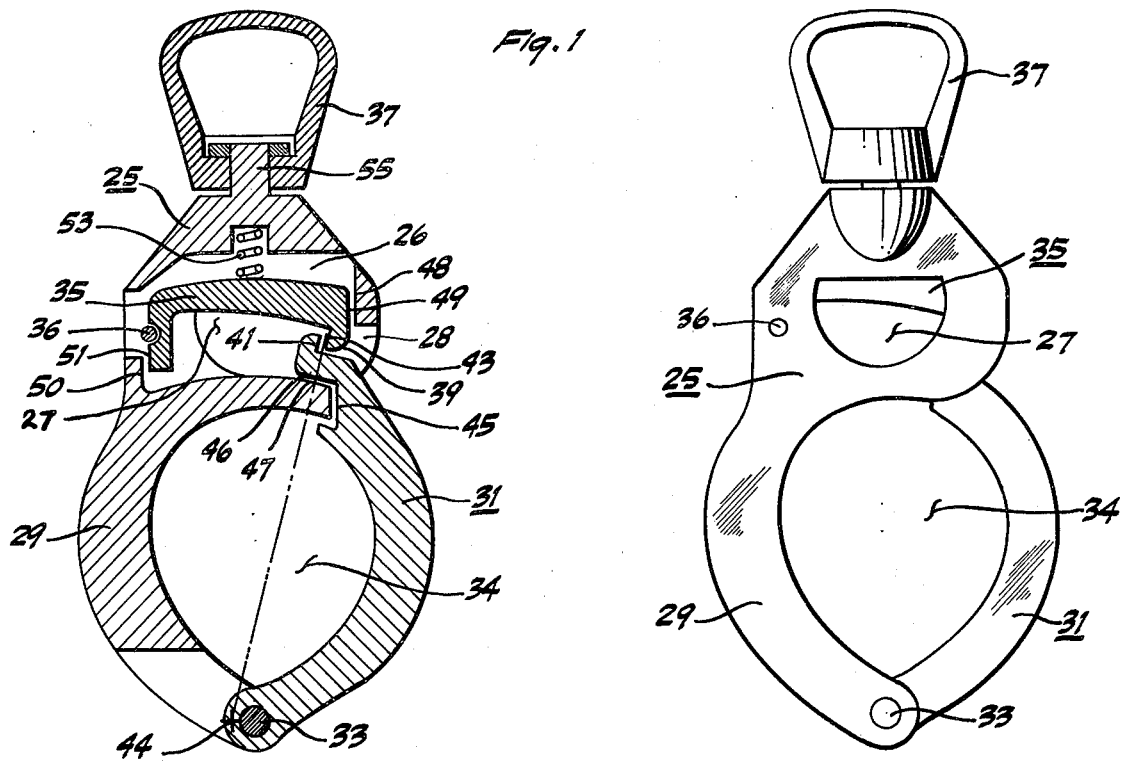
FIG. 2 illustrates a front view of a preferred embodiment of the invention.
FIG. 3 shows a cross-section view of the snap-shackle illustrated in FIG. 2 taken along a plane which symmetrically divides the device in two parts along its largest dimension.

FIG. 2 illustrates a preferred embodiment of the invention having a body member 25 with an interior cavity (not visible) and an aperture or opening 27 extending entirely through body 25 and into which aperture the interior cavity opens peripheral. A curved projection 29 extends from body 25 and has a curved hinge member or rotatable arm 31 rotatably attached thereto by a connecting pin 33 forming an opening 34 therebetween. A latch member or trigger latch 35 is pivotally mounted in the body cavity and opening 27 by pin 36. Swivel eye 37 is rotatably mounted to the end of body 27 oppositely disposed from projection 29.

In FIG. 3, which illustrates the device of FIG. 2 in cross-section showing the interior cavity, body member 25 has curved projection 29 extending therefrom to which is rotatably attached curved hinge member 31 by connecting pin 33. Body member 25 has cavity 26 therein which opens into aperture 27. Cavity 26 further communicates with opening or passage 28 into which the end of latch member or trigger 35 extends to engage a notch in the tip of hinge member 31, the notch having a surface 41 thereon which mates with and engages a locking surface or notch 43 at the end of latch member 35 to prevent rotation of hinge member 31. Surfaces 41 and 43 are positioned to contain a radial line segment extending from a center point 44 located between the end of hinge member 31 and pin 33, thereby forming radial interlocking surfaces and preventing rotational disengagement of hinge member 31 and latch member 35. Hinge member 31 has a recess 45 which has a surface 46 therein containing the arc of a circle having its center located at center point 44. Surface 46 slideably mates with and engages a surface 47 of body member 25 and prevents radial disengagement of radial surfaces 41 and 43 when the snap-shackle is under load. Body member 25 has a surface 48 interior to cavity 26 which slideably mates with the end surface 49 of latch member 35. The end of latch member 35 further has a rounded edge 39 over which the tip of hinge member 31 slides when hinge member 31 is rotated to engage latch member 35. Body member 25 further has a surface 50 interior to cavity 26 which mates with a surface 51 of the end of latch member 35 oppositely disposed from end surface 49 to limit the pivot motion of latch 35 around pin 36. A spring 53 is located in cavity 26 to bias latch member 35 in a pivotal position engaging locking surfaces 41 and 43 of hinge member 31 and latch member 35, respectively. Body member 25 has a swivel pin 55 extending therefrom oppositely disposed from the junction of projection 29 and hinge member 31 to which swivel eye 37 is rotatably attached.

Figure 4:
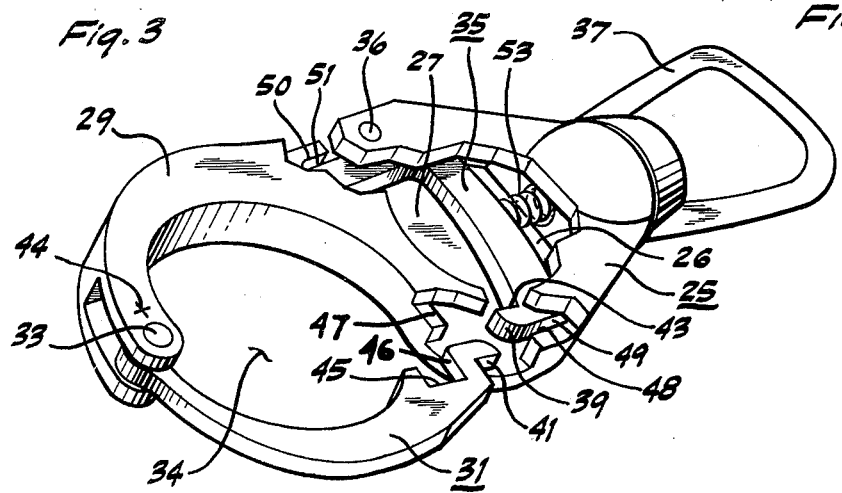
FIG. 4 is a perspective view, partly cut-away, of the snap-shackle illustrated in FIGS. 2 and 3.

FIG. 4 illustrates a perspective view, partly cut away, of the snap-shackle device illustrated in FIGS. 2 and 3 showing hinge member 31 rotatably disengaged from latch member 35 and body member 25, surface 41 being disengaged from surface 43 and surface 46 being disengaged from surface 47. End surface 49 of latch member 35 mates with and slides against surface 48 interior to cavity 26 of body member 25, body 25 being cut away to illustrate this sliding engagement when latch member 35 is pivoted against spring 53 to disengage hinge member 31. A portion of body 25 is further cut away to show surface 50 interior to cavity 26 engaging surface 51 of latch member 35. Another portion of body 25 is cut away to illustrate the position of spring 53 in the interior of cavity 25 between body member 25 and latch member 35.

The snap-shackle illustrated in FIGS. 2–4 can be made from any metal or material having a high tensile and shear strength sufficient to bear the load encountered in the rigging of sailing craft. A typical strength for a standary size snap-shackle is 16,000 pounds using a precipitation hardened stainless steel material.

Operation of a typical prior art device can be described by turning to FIG. 1 where opening 19 in rotating arm 11 engages cross-pin 15. When force is applied to this device by coupling the rigging of a sailing craft with swivel eye 21 and the opening formed by rotating arm 11 and projection 9, sufficient frictional forces are developed between opening 19 and pin 15 to prevent pin 15 from easily being slideably removed from opening 19 to disengage pin 15 from rotating arm 11. Therefore, under heavy loading, it may be necessary for a crew member to use both hands to supply the necessary force to pull pin 15 out of engagement with opening 19 in rotating arm 11 placing himself in a dangerous position in heavy seas. Furthermore, under conditions of heavy vibration and light loading, it is possible for pin 15 to vibrate out of disengagement with opening 19 of rotating arm 11 and cause the shackle to open inadvertently.

Operation of the invention can best be described by turning to FIG. 2. A rope or line can be linked or coupled through swivel eye 37 and another rope or line can be linked or coupled through opening 34 formed by projection 29 and hinge member 31. When the lines are placed under load such as when wind fills a sail attached to one of the lines, forces will be transmitted through the swivel eye 37 to body 25, projection 29 and hinge member 31 to the lines coupled through opening 34. Under load, the lines or ropes secured in opening 34 pass over pin 33 at the junction of hinge member 31 and projection 29. Therefore, very little rotating force will be placed upon hinge member 31 to cause surface 41 of hinge member 31 to bind against surface 43 of latch member 35 when hinge member 31 is engaged and locked by latch member 35. Loading forces which would tend to bend projection 29 are transmitted by hinge member 35 and mating surfaces 46 and 47 to body member 25. Since surfaces 46 and 47 include a circular arc having a center of radius at center point 44 offset from the center of pin 33, a self-opening force is generated under load to disengage surfaces 46 and 47 which tends to be balanced by the frictional force between surfaces 46 and 47. This balance of forces allows surface 43 of latch member 35 to slide easily out of disengagement with surface 41 of hinge member 31. Therefore, a stick or other elongated object can be inserted into aperture 27 to pivot latch member 35 about pin 36 with a minimum of force to disengage hinge member 31. As a result, in rough weather or heavy seas, a crew member may steady himself with one hand and easily and safely operate the snap-shackle as disclosed herein with the other hand.

Since Surface 46 of hinge member 31 engages surface 47 of body member 25 to prevent motion of hinge arm 31 under load in a radial direction toward pin 33 and, since surface 43 of latch member 35 engages surface 41 of hinge member 31 to prevent hinge member 31 from rotating away from body 25 when hinge member 31 is placed under load, it should be noted that hinge member 31 is doubly locked to prevent both radial and rotating motion.

By having latch member 35 located within cavity 26 interior to body 25, accidental opening of the latch to release hinge member 31 is prevented. However, a sufficient portion of latch member 35 is exposed in aperture 27 to make latch member 35 readily accessible to be pivoted to disengage hinge member 31. The appearance of latch member 35 in aperture 27 is much like that of a trigger in the trigger housing of a firearm, latch member 35 having a C-shape similar to that of a trigger.

Spring 53 biases latch 35 in a position to engage hinge member 31 when the tip of hinge member 31 is rotated into opening 28. The tip of hinge member 31 strikes rounded edge 39 of latch member 35 and forces latch 35 to pivot against spring 53 allowing the tip of hinge member 31 to slide under the end of latch member 35. When hinge member 31 is completely rotated into its locked position, spring 53 forces latch member 35 to pivotally return to engage surface 43 thereof with surface 41 of hinge member 31, thereby locking hinge member 31 in a closed position. It should be apparent that any loading force to which hinge member 31 may be subjected will not tend to force latch member 35 out of disengagement therewith since the engaged surfaces 41 and 43 are oriented to contain a portion of the line segment extending from center point 44 to form a slight hooking engagement as hinge member 31 attempts to rotate about pin 33 under load.

Latch member or trigger 35 has one end notched to receive and pivot about pin 36. Interior surface 48 of cavity 26 prevents latch member 35 from slipping out of rotating engagement with pin 36. When hinge member 31 is rotated to an open position out of engagement with latch member 35, interior surface 50 of cavity 26 engages end surface 51 of latch 35 to prevent latch member 35 from pivoting beyond its engaging and locking position.

Because of the double locking relationship of hinge member 31 in respect to latch 35 and body member 25, it should also be clear that vibration or shaking cannot disengage hinge member 31 from latch 35 to inadvertently open the snap-shackle and release the lines or ropes coupled therein.

Although the present invention has many applications for quick release coupling of lines and rigging, it should be noted that it has particular usefulness in connection with a snatch-block, a device well known to those skilled in sailing.

It now should be apparent that the present invention provides a double-locking trigger release snap-shackle which may be employed in conjunction with interconnecting the rigging of sailing craft for providing quick release and disengagement of various rigging components under all conditions of loading forces.

Although particular components, etc., have been discussed in connection with a specific embodiment of a snap-shackle constructed in accordance with the teachings of the present invention, others may be utilized. Furthermore, it will be understood that although an exemplary embodiment of the present invention has been disclosed and discussed, other applications and mechanical arrangements are possible and that the embodiments disclosed may be subjected to various changes, modifications and substitutions without necessarily departing from the spirit of the invention.

What is claimed is:

1. A snap-shackle for interconnecting the rigging components of sailing craft comprising:
    a body member having a curved projection extending therefrom, said body member having an aperture therethrough, an interior cavity which is peripheral to and opens into said aperture and a passage which extends between said interior cavity and the outer surface of said body;
    a trigger latch having one end thereof pivotally attached to said body within said cavity and the other end thereof positioned within said passage, the central portion of said trigger latch extending across a portion of said aperture and being exposed therein, said trigger latch being adapted to be pivoted by inserting an object into said aperture and engaging said central portion of said trigger latch, said other end of said trigger latch having a rounded surface with a notch therein;
    a curved rotatable arm having one end thereof rotatably joined to the outermost extremity of said curved projection, the other end of said curved rotatable arm having a rounded surface with a notch therein, said rounded surface of said other end being adapted to enter said passage and engage and slide along said rounded surface of said trigger latch until said notch of said trigger latch engages said notch of said curved rotatable arm whereby said curved rotatable arm is locked in a fixed position by said trigger latch to form an opening between said curved rotatable arm and said body member, said opening being adapted to receive and couple to rigging components of sailing craft, said trigger latch being pivoted by inserting an object in said aperture to disengage said trigger latch from said rotatable arm and to release said rigging components coupled in said opening; and
    coupling means attached to said body and oppositely disposed from the juncture of said curved projection and said curved rotatable arm for receiving and coupling to rigging components of sailing craft.

2. The snap-shackle described in claim 1 wherein said juncture of said curved projection and said curved rotatable arm is located at a point most distant from said coupling means to accept and bear the forces transmitted by rigging components of a sailing craft coupled therein thereby minimizing the forces on said curved rotatable arm and reducing the force required to disengage said trigger latch from said curved rotatable arm.

3. The snap-shackle described in claim 2 further including a bias spring located in said cavity between said body and said trigger latch to bias said trigger latch into the position which locks said curved rotatable arm in said fixed position.

4. The snap-shackle described in claim 3 wherein said other end of said curved rotatable arm further has a first arcuate surface and a first radial surface which respectively mate with and engage a portion of said body member when said curved rotatable arm is locked in said fixed position and wherein said notch of said curved rotatable arm has a second radial surface substantially oppositely disposed from said first radial surface and which mates with and is engaged by said notch of said trigger latch when said curved rotatable arm is in said fixed position, said first arcuate surface and said first and second radial surfaces engaged by said body member and said trigger latch, respectively, double lock said curved rotatable arm to prevent said curved rotatable arm from moving radially or angularly in any direction.

5. The snap-shackle described in claim 4 wherein said trigger latch is C-shaped, having one end pivotally attached to said body within said cavity and the other end in slidable engagement with an interior surface of said cavity in said body.

* * * * *